United States Patent [19]

Widmer

[11] 4,428,611
[45] Jan. 31, 1984

[54] ROTATING AND FOLDING REAR SEAT BACK MECHANISM

[75] Inventor: Paul Widmer, Warren, Mich.

[73] Assignee: General Motors Corporation, Detroit, Mich.

[21] Appl. No.: 394,630

[22] Filed: Jul. 2, 1982

[51] Int. Cl.³ .............................................. B60N 1/10
[52] U.S. Cl. ...................................... 296/66; 297/353
[58] Field of Search ............... 296/66, 65 R; 297/353, 297/378, 379

[56] References Cited

U.S. PATENT DOCUMENTS

| 3,001,820 | 9/1961 | Morphew | 296/66 |
|---|---|---|---|
| 3,113,801 | 12/1963 | Caley | 296/66 |
| 3,171,682 | 3/1965 | Buser et al. | 296/66 |
| 3,292,970 | 12/1966 | Wilson | 296/66 |
| 3,311,405 | 3/1967 | Brennan et al. | 296/66 |
| 3,529,863 | 9/1970 | Belfry | 296/66 |
| 3,727,976 | 4/1973 | Lystad | 297/340 |

Primary Examiner—Robert R. Song
Attorney, Agent, or Firm—William A. Schuetz

[57] ABSTRACT

A seat assembly for an automotive vehicle is disclosed which includes a seat cushion unit and a back rest unit which is adapted to be moved from a generally upright position to a generally horizontal position located rearwardly of the seat cushion unit to provide a cargo carrying platform. The back rest unit has a back rest which is rotatably supported intermediate its ends by a pair of hinge arms for movement 180° to position its planar back side adjacent the seat cushion unit. The seat assembly also has a latching mechanism including a three position lever means for holding the seat back unit in its upright position, allowing the back rest to be rotated 180° which retaining the hinge arms in an upright position and allowing the rotated back rest and hinge arms to be moved from their upright position to a generally horizontal position. Also, hinged panels on the back side of the back rest can be folded forwardly and rearwardly to provide a planar platform when the back rest unit is moved to its horizontal position.

5 Claims, 9 Drawing Figures

ROTATING AND FOLDING REAR SEAT BACK MECHANISM

The present invention relates to vehicle seat assemblies and in particular to a vehicle seat assembly having a back rest unit which can be rotated and folded rearwardly to provide a generally horizontal cargo platform.

Vehicle seat assemblies having a seat cushion and a foldable back rest unit which can be folded over the seat cushion to provide a generally horizontal cargo carrying area have heretofore been provided. Such back rest units have also included a hinged panel on its backside which can be folded either forwardly or rearwardly of the back rest to a generally horizontal position so as to increase the generally horizontal cargo carrying area. Examples of such seat assemblies are shown in Brennan et al, U.S. Pat. No. 3,311,405 and Lystad, U.S. Pat. No. 3,727,976, both of which were assigned to the same assignee as the present invention.

It is also known to provide a seat assembly having a seat cushion and a back rest unit which is first rotated 180° while in an upright position so that its generally planar backside faces forwardly of the vehicle and then folded rearwardly of the seat cushion so as to be generally horizontal therewith to provide a cargo carrying platform area. Such a seat assembly is shown in Buser et al, U.S. Pat. No. 3,171,682, and assigned to the same assignee as the present invention.

The present invention provides a seat assembly for an automotive vehicle of the general type shown in the Buser et al patent, but which includes a novel means for supporting and folding the seat back rest which is both simple and economical, which can be easily folded and unfolded by one person, and which includes a back rest having planar hinged panels on its backside which can be folded forwardly and rearwardly of the seat back when folded to its horizontal position so as to provide a generally horizontal cargo carrying platform which extends from the front seat to the rear of the vehicle.

Accordingly, an object of the present invention is to provide a new and improved seat assembly for an automotive vehicle which includes a seat cushion unit and a back rest unit which is adapted to be moved from a generally upright position to a generally horizontal position located rearwardly of the seat cushion unit to provide a cargo carrying platform, and wherein the back rest unit comprises a pair of laterally spaced hinge arms pivotally supported for movement about a generally horizontal axis between an upright position and a generally horizontal position located rearwardly of the seat cushion unit, a back rest rotatably supported intermediate its ends by the hinge arms for movement about a generally horizontal axis between a first position in which its cushion side is adjacent the seat cushion unit and a second position in which its planar backside is adjacent the seat cushion unit, and a latching mechanism including a three position lever means for holding the seat back unit in its upright position when the lever means is in its first position, allowing the back rest to be rotated from its first position towards its second position while retaining the hinge arms in their upright position when the lever means is moved to its second position, and allowing the back rest and the hinge arms to be pivoted from an upright position toward a generally horizontal position when the lever means is moved to its third position.

Another object of the present invention is to provide a new and improved seat assembly, as defined in the next preceding object, and wherein the lever means of the latch is pivotally supported by the vehicle and has first and second opposed entry end slots disposed on opposite sides of its pivotal axis and laterally spaced from each other for receiving first and second pin means respectively carried by the back rest and hinge arm so as to provide a latch mechanism which is of a simple and economical construction and which can be readily manually manipulated to effect movement of the seat back unit between its upright and folded positions.

Yet another object of the present invention is to provide a new and improved vehicle seat assembly, as defined in the preceding objects, and wherein the back rest unit includes a second latch mechanism for normally preventing the hinge arms of the back rest unit from being moved rearwardly from its upright position, but which is trippable by the first pin means carried by the seat back rest in response to the latter being rotated 180° to its second position in which its back side faces the seat cushion so as to automatically release said second latch mechanism to enable the hinge arms and back rest to be folded rearwardly toward a generally horizontal position when desired.

A further object of the present invention is to provide a new and improved seat assembly, as defined in the preceding objects, and wherein the back rest unit on its backside carries hinged panel members which normally overlie the backside thereof, but which can be folded or moved when the seat back rest is in its generally horizontal position so as to provide a cargo carrying platform area forwardly over the seat cushion unit and rearwardly towards the vehicle rear whereby substantially the entire area from the rearward side of the front seat of the vehicle to the rear of the vehicle becomes a generally horizontal cargo carrying platform.

The present invention further resides in various novel constructions and arrangement of parts, and further objects, novel characteristics and advantages of the present invention will be apparent to those skilled in the art to which it relates and from the following detailed description of the illustrated, preferred embodiments thereof made with reference to the accompanying drawings forming a part of this specification and in which similar reference numerals are employed to designate corresponding parts throughout the several views, and in which.

Figure 1:
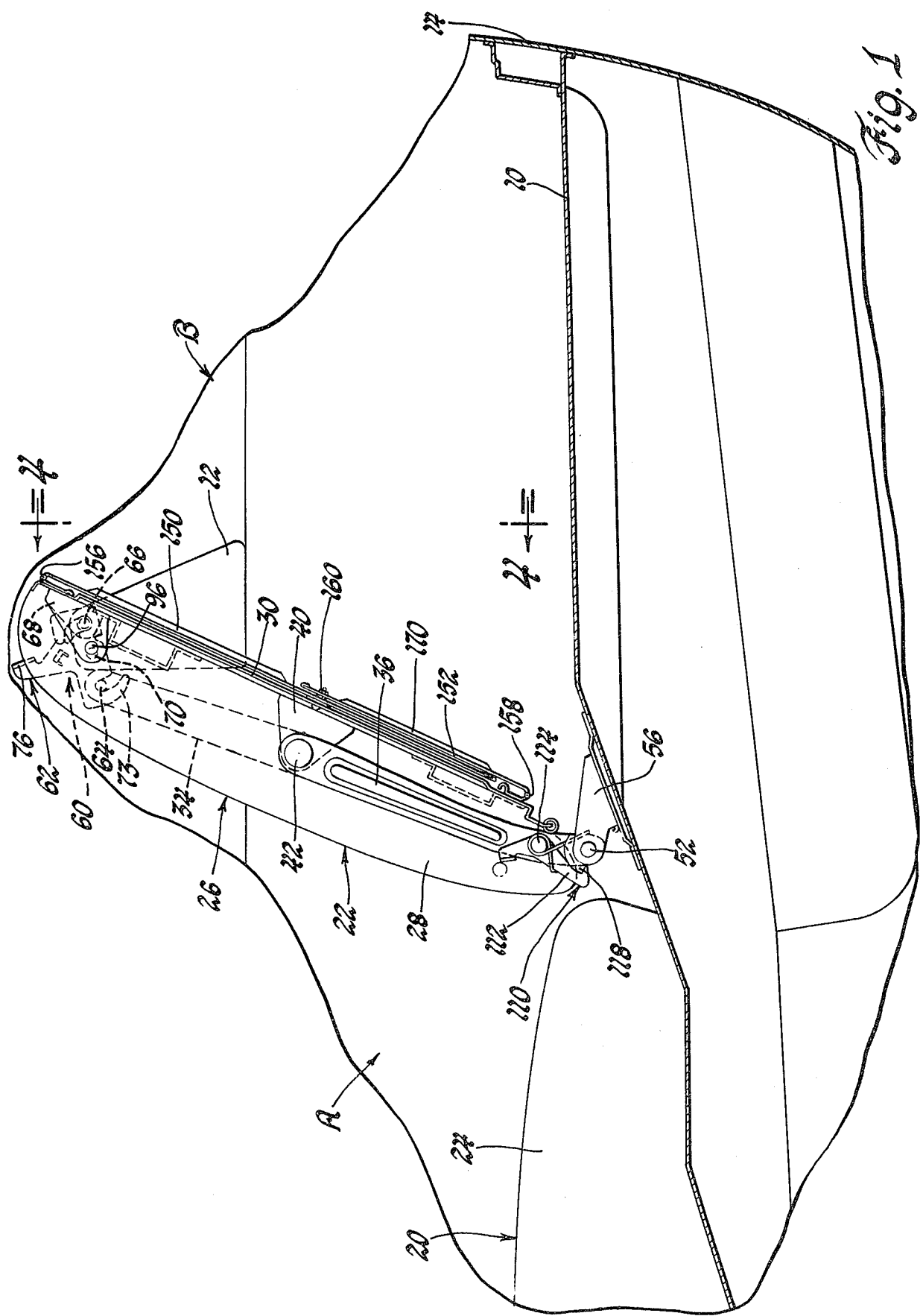
FIG. 1 is a partial side elevational view, with portions shown in section, of a vehicle embodying the novel seat assembly of the present invention.

The present invention provides a novel rear seat assembly A for use in an automotive vehicle B. The seat assembly A could be used in any suitable automotive vehicle, but is particularly designed for use with a compact vehicle to increase the cargo carrying capacity thereof. As shown in FIG. 1, the vehicle B comprises vehicle body structure having a dished floor panel 10 including narrow width ledges disposed adjacent the sides of the vehicle, side support or panels 12 and 13 and a rear 14. The floor panel 10, side panels 12, rear 14, roof structure (not shown) and rear hatchback (not shown) together with a seat assembly A define a rear stowage compartment 15 for carrying cargo.

The novel rear seat assembly A comprises, in general, a seat cushion unit 20 and a back rest unit 22. The seat cushion unit 20 can be of any suitable or conventional construction and is shown in FIG. 1 as including a seat cushion 24.

The back rest unit 22 includes a seat back rest 26 having a suitable seat cushion 28 on its front side and a metal planar support or panel 30 on its backside.

Figure 2:
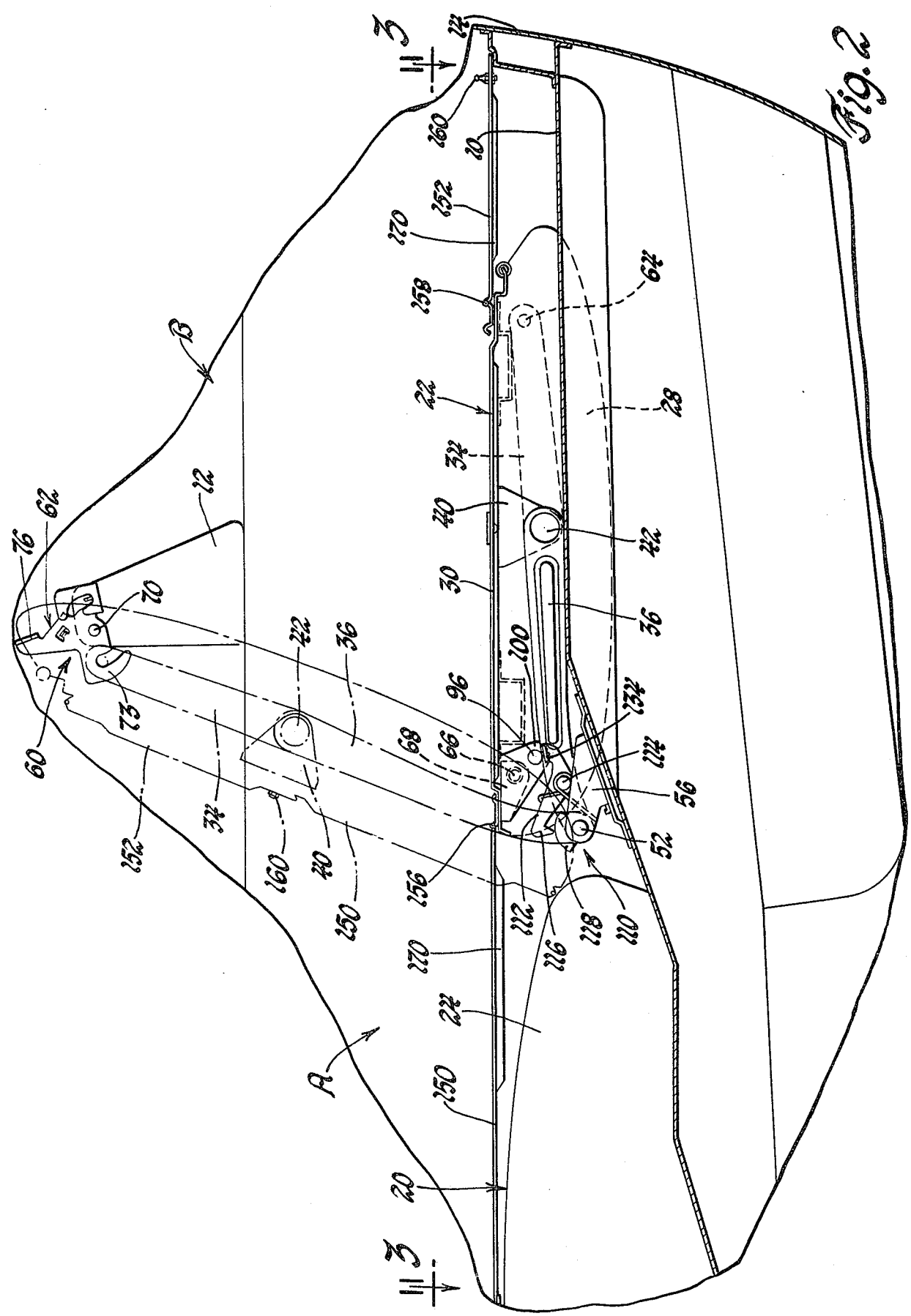
FIG. 2 is a view like that shown in FIG. 1, but showing different parts of the seat assembly in different positions.

The back rest 26 is pivotally supported intermediate or midway between its upper and lower ends by a pair of hinge arms 34 and 36 for movement between a first or upright position, as shown in FIG. 1, in which its cushion 28 faces the seat cushion 24 and forms an obtuse included angle therewith and a second position, as shown in FIG. 2, in which its backside 30 faces the seat cushion 24 and forms an obtuse included angle therewith. To this end, the back rest includes spaced ears 40 located on opposite sides of the back rest cushion 28 and which are suitably secured or welded to the metal back support 30 of the back rest 26. The ears 40 extend transversely of the metal back support 30 and together straddle the back rest cushion 28. The ears 40 have transverse openings which are aligned with transverse openings adjacent the upper end of the hinge arm 36 and midway of the hinge arm 34 and through which suitable pivot pin means 42 are received. The pivot pin means 42 rotatably support the back rest 26 on the hinge arms 34 and 36.

The hinge arms 34 and 36 of the back rest 26 are pivotally supported by the vehicle B for movement between an upright position, as shown in FIG. 1, and a generally horizontal position, as shown in FIG. 2. To this end, the hinge arms 34 and 36 at their lower ends are welded or otherwise stationarily secured to a hollow pintle or tubular member 48 extending laterally across the back rest 26 adjacent its lower end. The hollow pintle 48 in turn at its opposite ends is rotatably supported by pivot pins 50 and 52. The pivot pins 50 and 52 are slidably received within the hollow ends of the pintle 48 and are supported in a nonrotatable fashion by a pair of brackets 54 and 56 suitably secured to the floor panel 10 of the automotive vehicle B. It will thus be seen that the hinge arms 34 and 36 and the hollow pintle 48 form a generally U-shaped frame for supporting the back rest 26.

The seat back rest unit 22 is releasably retained in its normal upright position, as shown in FIG. 1, by a latch mechanism 60. The latch mechanism 60 comprises a three position lever or lever means 62, a striker or pin means 64 carried at the upper end of the hinge arm 34 and a striker or pin means 66 carried by the back rest 26. The striker 64 comprises a stationary pin secured to the hinge arm 34 at its upper end and extending transversely outwardly thereof. The striker 66 comprises a stationary pin carried by an ear 68 secured to the metal back 30 of the seat back rest 26 and which extends transversely outwardly of the seat back rest 26.

As best shown in FIGS. 5-8, the three position lever 62 comprises a one-piece metal member which is pivotally secured to the vehicle side body structure 12 by a pivot pin means 70. The lever 62 is pivotally supported by the pivot pin means 70 for movement about the pivotal axis 72 of the pin means 70. The lever 62 comprises a planar base 73, an ear or flange 74 laterally spaced from the base 73, but lying in a plane which is parallel to the plane of the base, a bridge or bridge portion 75 extending transversely of the base 73 and interconnecting the base 73 and ear 74 and a flange or handle 76 at its upper end.

Figure 7:
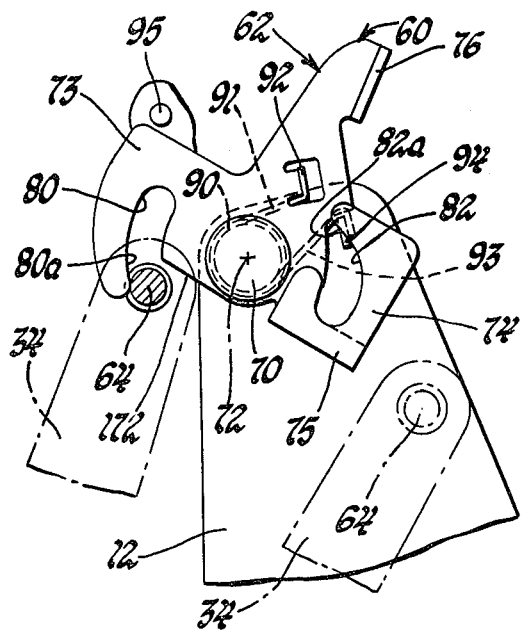
FIG. 7 is a view like that shown in FIGS. 5 and 6, but showing different parts thereof in different positions.
Figure 8:
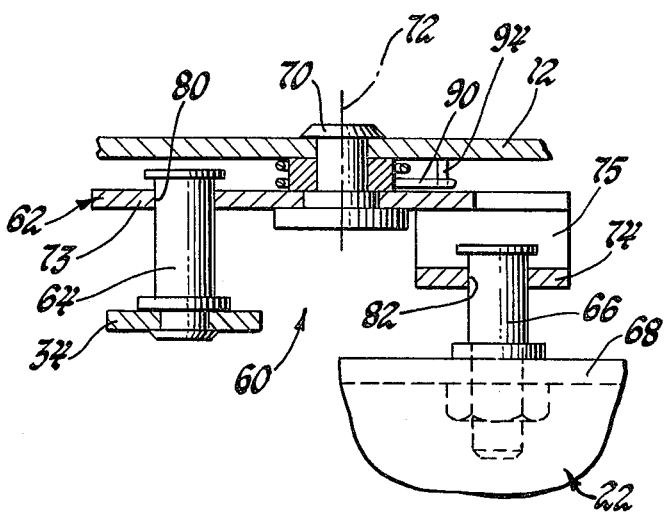
FIG. 8 is a sectional view looking in the direction of the arrows 8—8 of FIG. 5.

The lever 62 includes first and second arcuately extending through slots 80 and 82 disposed on opposite sides of its pivotal axis 72 and having opposed or oppositely facing entry ends 80a and 82a. The slot 80 is located in the base 73, is concentric with the axis of the pivot pin means 72 and has its entry end 80a facing downwardly to receive the striker 64. The slot 82 has the configuration shown in FIG. 7 and has its entry end 82a facing upwardly to receive the striker 66. As best shown in FIGS. 7 and 8, the slot 82 is located in the ear 74 of the lever 62 so as to be laterally spaced from the slot 80. This enables the striker 66 carried by the back rest 26 to be rotated and not interfere with the hinge arm 34.

Figure 5:
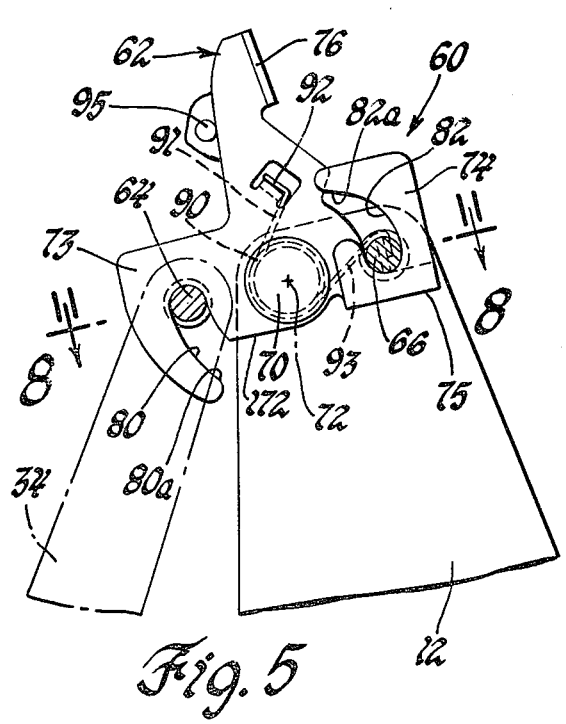
FIG. 5 is an enlarged sectional view looking in the direction of the arrows 5—5 of FIG. 4.
Figure 6:
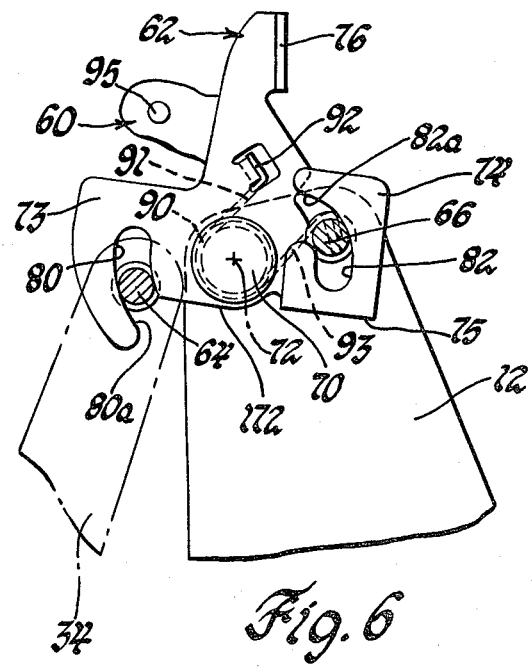
FIG. 6 is a view like that shown in FIG. 5, but showing different parts thereof in different positions.

The three position lever 62 is adapted to be pivotally moved between first, second and third positions. When in its first position, as shown in FIG. 5, the slots 80 and 82 thereof receive the strikers 64 and 66 to hold the hinge arm 34 in its upright position and to hold the back rest 26 in its first or upright position, as shown in FIG. 1. When in its second position, as shown in FIG. 6, the lever 62 is positioned such that the striker 64 of the hinge arm 34 is still located within the slot 80 so as to hold the hinge arm 34 in place, but the striker 66 carried by the back rest 26 is located adjacent the entry end 82a of the slot 82 to allow the back rest to be rotated in a counterclockwise direction from its position shown in FIG. 1 to its position shown by the phantom lines in FIG. 2. When the lever 62 is in its third position, as shown in FIG. 7, the striker 64 of the hinge arm 34 clears the slot 80 to allow the hinge arms 34 and 36 and now rotated back rest 26 to be moved from their upright position shown by the phantom lines in FIG. 2, to their generally horizontal position as shown by the solid lines in FIG. 2.

The lever 62 is biased towards its first position, as shown in FIG. 5, by a spring means 90. Spring means 90 comprises a spring wound around the pivot pin means 70, and having one end leg 91 thereof suitably secured to the latch lever 62 as indicated at 92 and its other end leg 93 suitably secured to an ear 94 on the vehicle side structure 12. As the latch lever 62 is moved clockwise from its first position, as shown in FIG. 5, to its second and third positions, as shown in FIGS. 6 and 7, respectively, it is moved in opposition to the biasing force of the spring means 90, since the leg 91 is moved toward the leg 93. When the latch lever 62 is released, the spring means 90 returns the same to the position shown in FIG. 5. The latch lever 62 engages a suitable stop pin 95 carried by the vehicle body side structure 12 when biased to its position shown in FIG. 5.

It should be noted at this point that when the back rest 26 is in its upright position, as shown in FIG. 1, in which it is latched to the latch mechanism 60, a striker or stop pin 96 carried by the seat back rest 26 at its side opposite the striker 66 engages a suitable stop or bracket 100 carried by the vehicle body side structure 13. This provides support for the back rest unit 26 at both its upper lateral ends.

Figure 9:
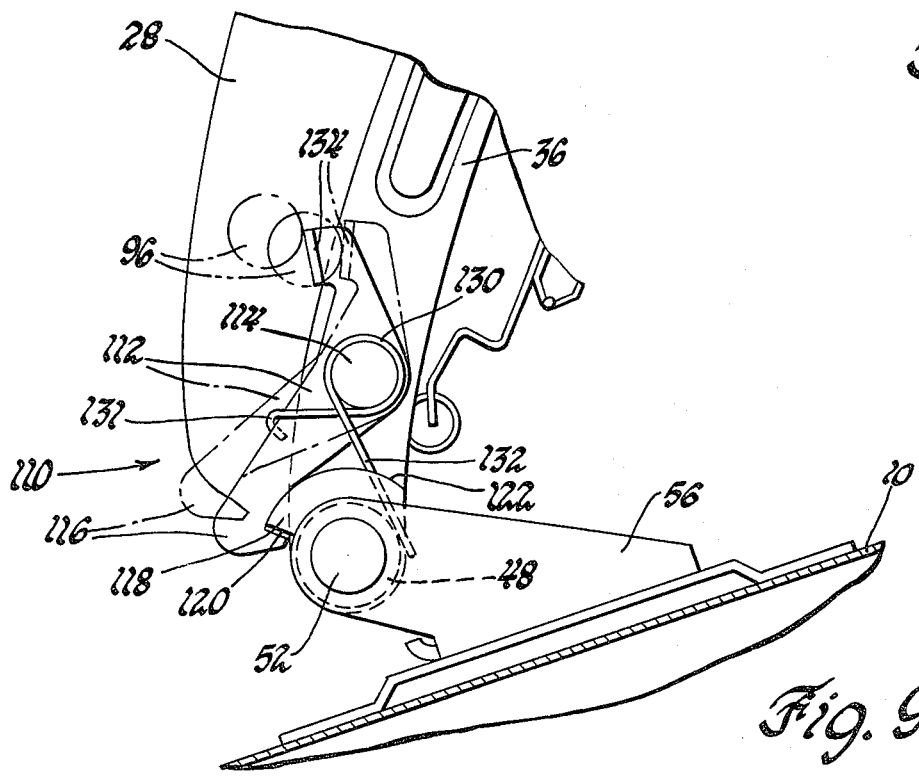
FIG. 9 is an enlarged side elevational view of part seat assembly shown in FIG. 1.

The back rest unit 22 also includes a second latch mechanism 110 which aids in supporting the seat back unit 22 in its upright position, as shown in FIG. 1, and which prevents the back rest 26 from being moved rearwardly from its upright position to a generally horizontal position should the lever 62 be accidently moved to a position to disengage the strikers 64 and 66 with the seat in an upright position. The latch mechanism 110 includes a latch lever 112 pivotally supported intermediate its upper and lower ends, as viewed in FIG. 9, by the hinge arm 36 via a pivot pin means 114 carried by the hinge arm 36. The latch lever 112 adjacent its lower end, includes a hooked end portion 116 which is adapted to engage a stationary catch 118 welded or otherwise secured to the tubular pintle 48. Catch 118 has a first surface 120 which is adapted to be engaged by the hooked end 116 of the latch lever 112 and an upper cam surface 122 which is concentric with the axis of the pivot pin means 52. The latch member 112 has its hooked end 116 biased into engagement with the catch 118 by a spring means 130. The spring means 130 surrounds the pivot pin means 114 and has one end leg 131 in engagement with the latch lever 112 adjacent its hooked end 116 and the other end leg 132 in engagement with the pintle 48. The bias of the spring 130 is such that the leg 131 pivots the latch member 112 in a counterclockwise direction about the axis of the pivot pin means 114, as viewed in FIG. 9, so as to insure engagement of the hooked end 116 in engagement with the catch 118. The latch member 112 at its upper end has a transversely extending flange 134 which is adapted to be engaged by the striker 96 carried by the back rest 26 when the back rest 26 is rotated from its position shown in FIG. 1 to its position shown in FIG. 2, as will be hereinafter more fully described.

Figure 3:
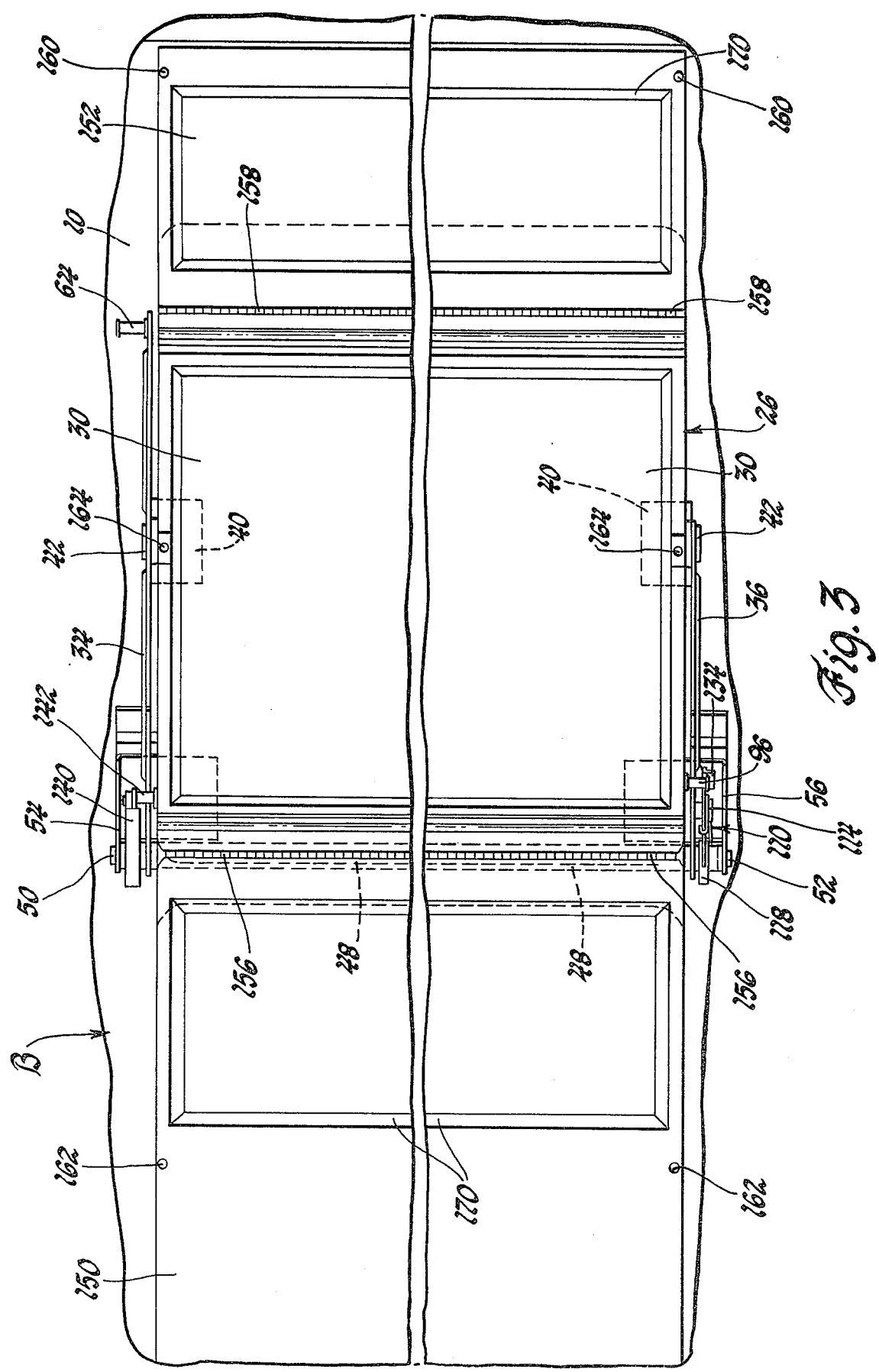
FIG. 3 is a top plan view looking in a direction of the arrows 3—3 of FIG. 2.
Figure 4:
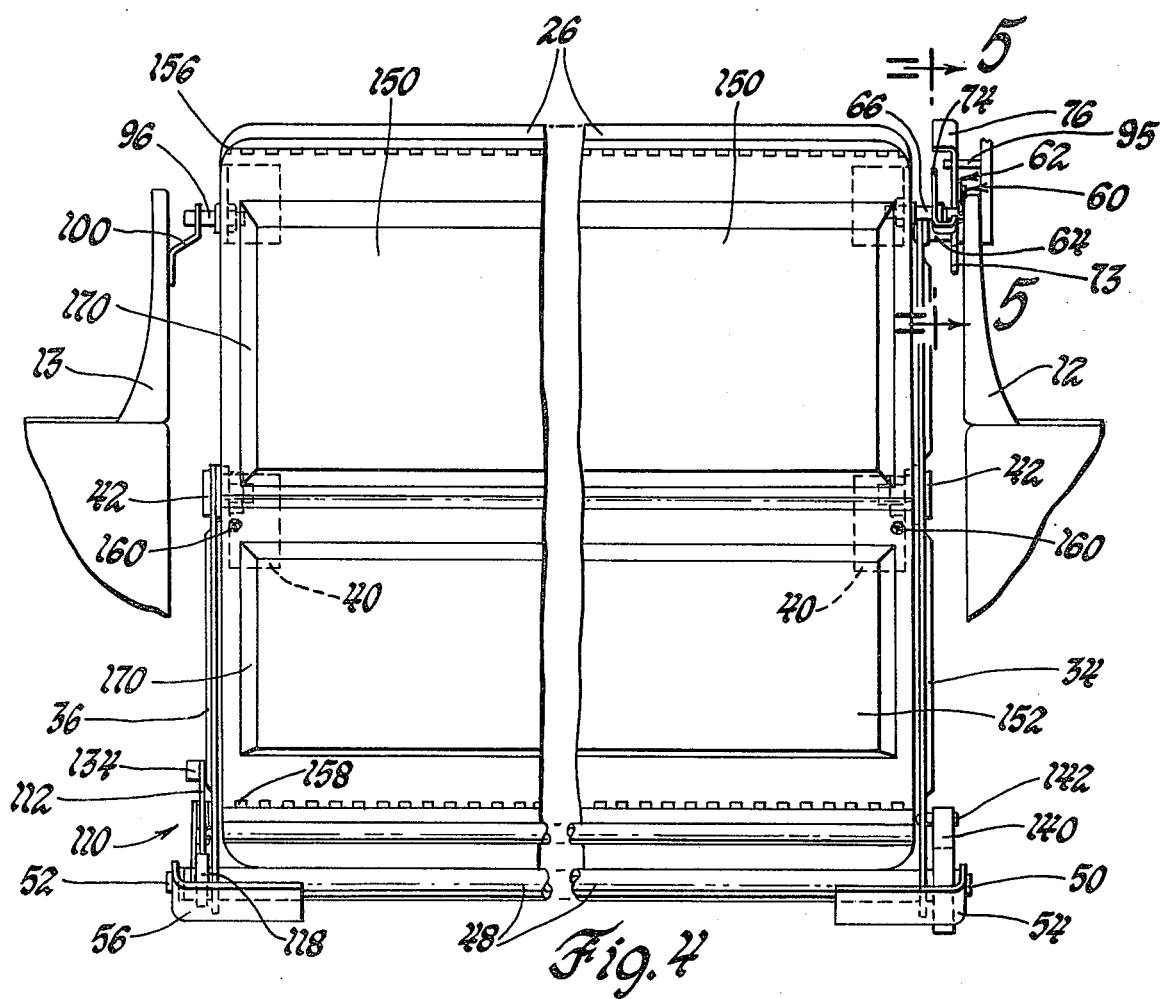
FIG. 4 is a rear elevational view looking in a direction of the arrows 4—4 of FIG. 1.

As best shown in FIGS. 3 and 4, the back rest unit 22 also includes a suitable spring means 140 carried by the pivot pin means 52 and engaging a transverse pin 142 carried by the hinge arm 34 for biasing the back rest unit 22 in a clockwise direction, as viewed in FIG. 1, to biasingly hold the hinge arm 34 in engagement with the lever 62 and the latch member 112 in engagement with the catch member 118 to minimize noise due to rattling and to counterbalance the back rest unit.

In operation, when it is desired to lower or fold the back rest unit 22 from its upright position, as shown in FIG. 1, to its generally horizontal position, as shown in FIG. 2, the operator need merely rotate the latch member 62 in a clockwise direction from its position as shown in FIG. 5 to the position shown in FIG. 6 in which the striker 66 is disposed adjacent the entry end 82a of the slot 82. When in this position, the striker 66 can be moved clear of the slot 82 and the back rest 26 can be rotated 180° from its position shown in FIG. 1 to the position shown in the phantom lines in FIG. 2 in which the backside 30 thereof is disposed adjacent the seat cushion 24. When the 180° rotation of the back rest 26 nears its completion, the striker 66 thereof will be rotated to a position in which it engages the flange 132 of the latch member 112. As the striker 66 engages the latch member 112 it causes the same to be pivotally moved in a clockwise direction about the axis of its pivot means 114, as viewed in FIG. 1, to disengage the hooked end 116 thereof from the catch member 118. This clears the latch member 112 so as to enable the hinge arms 34 and 36 to be rotated.

When the seat back rest 26 has been rotated the full 180°, the operator can then move the latch lever 62 from the position shown in FIG. 6 to the position shown in FIG. 7 in which the striker 64 carried by the hinge arm 34 clears the entry end 80a of the slot 80 in the lever 62. When this occurs, the hinge arms 34 and 36 and the seat back unit 26 can be rotated from their generally upright position as shown by the phantom line in FIG. 2 to the position shown by the full lines in FIG. 2 in which the backside 30 of the seat back rest 26 is located in a horizontal position and the back rest cushion 28 engages the floor panel 10 of the vehicle B.

It will thus be apparent that when the seat back unit 22 is folded to its horizontal position, it is located rearwardly of the seat cushion 24 and is supported by the bottom panel 10 on the vehicle B. It should also be apparent that the entire folding operation can be easily and quickly done by a single person by merely rotating the latch lever 62 and rotating the back rest 26 180° by pushing thereon with one's hand. The unlatching of the latch mechanism 110 takes place automatically in response to rotation of the back rest 26 180°.

In order to provide for a generally horizontally extending cargo carrying platform area which is in the same plane as the back 30 of the back rest 26, the back rest unit 22 is provided with a pair of hinged panels 150 and 152. As best shown in FIG. 3, the panel 150 is generally planar and is hinged adjacent its right end to one end of the back 30 of the back rest 26 by a hinge means 156. The panel 152 adjacent its left end, as viewed in FIG. 3, is hinged to the other end of the back 30 of the back rest 26 by a hinge means 158.

The panels 150 and 152 are normally retained in a folded position against the back side 30 of the back rest 26, as best shown in FIGS. 1 and 4 by snap fastener means 160. The panel 150 is longer than the panel 152 and is first folded against the back side 30 of the back rest 22 and then the panel 152 is folded over the panel 150. The snap fastener means 160 comprise laterally spaced headed pins carried by the panel 152 which extend through aligned openings 162 in the panel 150 and are snap fittingly received in aligned catches 164 carried by the back side 30 of the back rest 26.

When the back rest unit 22 is folded to its generally horizontal position, as shown in FIG. 2, the panel 152 can be pulled to release it from the back side 30 of the back rest 26 and then rotated about its hinge means 158 until it is horizontal. The panel 152 is of a length to extend from the back rest 26 to the rear of the vehicle B. This provides for a continuum of the horizontal platform cargo carrying area from the backside of the seat back rest to the rear of the vehicle B. The panel 150 can then be folded or rotated about its hinge means 156 and laid on top of the seat cushion 24 to form a horizontal continuum with the backside 30 of the back rest 26. The length or extent of the panel 150 is such that it completely overlies the seat cushion unit 24. The panels 150 and 152 are provided with suitable strengthening ribs 170.

It will thus be apparent that with the foldable panels 150 and 152 and the backside 30 of the back rest 26, a continuous horizontally extending cargo carrying platform is provided which extends from the rear of the front seat of the vehicle to the rear end of the vehicle B.

This maximizes the capacity of the vehicle B to carry cargo.

When it is desired to move the back rest unit from its generally horizontal position, as shown by the full lines in FIG. 2, to its upright position, as shown in FIG. 1, the operator will first fold the panel 150 against the backside 30 of the back rest 26 and then fold the panel 152 over the backside of the panel 150. When so folded, the snap fasteners 160 will engage the catches 164 to releasably retain the panels 150 and 152 in their folded position on the backside 30 of the back rest 26. The operator can then move the seat back unit 22 in an upward direction. As the back rest 26 is moved in an upward direction, the hooked end 116 of the latch lever 112 will ride on the upper surface 122 of the catch 118 and the latch lever 62 will be in the position shown in FIG. 5 in which it is ready to receive the striker 66 on the hinge arm 34. As the back rest 26 approaches its upper position, the latch member 112 will re-engage the catch 118, as shown by the solid lines in FIG. 9, due to the biasing force of the spring 130 and the striker 64 will engage surface 172 adjacent the slot 80 on the lever 62 and cam the lever 62 in a clockwise direction, as viewed in FIG. 5, until the striker 64 is located adjacent the entry end 80a of the slot 80. When this occurs, the striker 64 will enter the slot 80 and the lever 62 will be returned to the position shown in FIG. 5 by the spring 90. When the hinge arms 34 and 36 are in their upright position, the operator can then rotate the back rest 26 in a clockwise direction from its position, as shown in phantom lines in FIG. 2, to the position shown in FIG. 1 in which the cushion side 28 thereof faces the seat cushion 24. As the back rest 26 is rotated to its position shown in FIG. 1 the striker pin 66 will be received within the slot 82 and the ear 74 will retain the same in place. When the lever 62 is in position shown in FIG. 5 and the striker pins 64 and 66 are fully received within their respective slots 80 and 82, the back rest 26 is latched in its upright position.

From the foregoing, it should be apparent that a novel seat assembly for use with automotive vehicles has been provided. It should also be apparent that a novel foldable rear seat back rest unit has been provided which can be readily, manually manipulated so as to be easily folded. It should also be apparent that with the use of the overlapping hinged panels, a cargo carrying platform area can be provided which extends from the back of the front seat of the vehicle to the rear of the vehicle.

Although the illustrated embodiments hereof have been described in great detail, it should be apparent that certain modifications, changes and adaptations may be made in the illustrated embodiments, and that it is intended to cover all such modifications, changes and adaptations which come within the spirit of the present invention.

The embodiments of the invention in which an exclusive property or privilege is claimed are defined as follows:

1. In combination with a vehicle having body support structure,
   a seat assembly supported by said body support structure and including a generally horizontal seat cushion unit and a back rest unit which is adapted to be moved from a generally upright position to a generally horizontal position located rearwardly of the seat cushion unit to provide a cargo platform,
   said back rest unit comprising a pair of laterally spaced hinge arms pivotally supported for movement about a generally horizontal axis between an upright position and a generally horizontal position located rearwardly of the seat cushion unit,
   a back rest rotatably supported intermediate its ends by said hinge arms for movement about a generally horizontal axis between a first position in which its cushion side is adjacent the seat cushion unit and a second position in which its backside is adjacent the seat cushion unit, and
   means for holding said seat back unit in its upright position, allowing said back rest to be rotated from its first position toward its second position and allowing said back rest and hinge arms to be pivoted from an upright position toward said generally horizontal position, the improvement being that
   said last mentioned means comprises a latch mechanism having a three position lever means which is operable when in its first position to hold the hinge arms in their upright position and the back rest unit in its first position, which is operable when moved to its second position to release the back rest for manual movement from its first position to its second position while retaining said hinge arms in their upright position, and which is operable when in its third position to allow the hinge arms and back rest to be moved in unison from an upright position to said generally horizontal position rearwardly of the seat cushion unit whereby said backside of said seat back rest provides a cargo platform.

2. In combination with a vehicle having body support structure,
   a seat assembly supported by said body support structure and including a generally horizontal seat cushion unit and a back rest unit which is adapted to be folded from a generally upright position to a generally horizontal position located rearwardly of the seat cushion unit to provide a generally flat cargo platform,
   said back rest unit comprising a pair of laterally spaced hinge arms pivotally supported adjacent its lower end for movement about a generally horizontal axis between an upright position and a generally horizontal position located rearwardly of the seat cushion,
   a back rest rotatably supported intermediate its ends by said hinge arms for movement about a generally horizontal axis, said back rest having a cushion side and a backside,
   said backside being rotatable while said hinge arms remain in their upright position between a first position in which its cushion side defines an obtuse included angle with the seat unit and a second position in which its backside forms an obtuse included angle with the seat unit, and
   a latching mechanism including a latch member pivotally supported by said body structure for for movement about a generally horizontal axis between first, second and third positions, a first pin means carried by one of said hinge arms adjacent its upper end and a second pin means carried by said back rest unit adjacent its upper end, said latch member having first and second slots disposed on opposite sides of its pivotal axis for receiving said first and second pin means, respectively, said latch member engaging both said first and second pin means to hold said back rest in its first position and said hinge arms in their upright positions when in its first position, said latch member when moved to its second position allowing said second pin means and said back rest unit to be rotated from its first position toward its second position while still engaging said first pin means to hold said hinge arms in their upright position, said latch member when moved to its third position allowing said first pin means and said hinge arms along with the rotated back rest unit to be moved together from said upright position toward said generally horizontal position whereby said backside of said back rest will be located rearwardly of the seat cushion to provide a flat cargo platform.

3. In combination with a vehicle having body support structure,
a seat assembly supported by said body support structure and including a generally horizontal seat cushion unit and a back rest unit which is adapted to be moved from a generally upright position to a generally horizontal position located rearwardly of the seat cushion unit to provide a cargo platform,
said back rest unit comprising a pair of laterally spaced hinge arms pivotally supported for movement about a generally horizontal axis between an upright position and a generally horizontal position located rearwardly of the seat cushion unit,
a back rest rotatably supported intermediate its ends by said hinge arms for movement about a generally horizontal axis between a first position in which its cushion side is adjacent the seat cushion unit and a second position in which its backside is adjacent the seat cushion unit, and
means for holding said seat back unit in its upright position, allowing said back rest to be rotated from its first position towards its second position and allowing said back rest and hinge arms to be pivoted from an upright position toward said generally horizontal position, the improvement being that
said last mentioned means comprises a first latch mechanism having a three position lever means which is operable when in its first position to hold the hinge arms in their upright position and the back rest unit in its first position, which is operable when moved to its second position to release the back rest for manual movement from its first position to its second position while retaining said hinge arms in their upright position, and which is operable when in its third position to allow the hinge arms and back rest to be moved in unison from an upright position to said generally horizontal position rearwardly of the seat cushion unit whereby said backside of said seat back rest provides a cargo platform, and
a second latch mechanism having a pivotal latch member which is movable between a first position in which it engages a stationary catch member to prevent said hinge arms from being moved rearwardly past their upright position and a second position in which it clears said catch member to allow said hinge arms to be moved rearwardly from their upright position toward their generally horizontal position, said latch member of said second latch mechanism being engaged by a striker means on said back rest unit to move the same toward its second position when the back rest unit is moved toward its second position.

4. In combination with a vehicle having body support structure,
a seat assembly supported by said body support structure and including a generally horizontal seat cushion unit and a back rest unit which is adapted to be folded from a generally upright position to a generally horizontal position located rearwardly of the seat cushion unit to provide a generally flat cargo platform,
said back rest unit comprising a pair of laterally shaped hinge arms pivotally supported adjacent its lower end for movement about a generally horizontal axis between an upright position and a generally horizontal position located rearwardly of the seat cushion,
a back rest rotatably supported intermediate its ends by said hinge arms for movement about a generally horizontal axis, said back rest having a cushion side and a back side,
said back rest being rotatable while said hinge arms remain in their upright position between a first position in which its cushion side defines an obtuse included angle with the seat unit and a second position in which its backside forms an obtuse included angle with the seat unit,
a first latching mechanism including a latch member pivotally supported by said body structure for movement about a generally horizontal axis between first, second and third positions, a first pin means carried by one of said hinge arms adjacent its upper end and a second pin means carried by said back rest unit adjacent its upper end, said latch member having first and second slots disposed on opposite sides of its pivotal axis for receiving said first and second pin means, respectively, said latch member engaging both said first and second pin means to hold said back rest in its first position and said hinge arms in their upright positions when in its first position said latch member when moved to its second position allowing said second pin means and said back unit to be rotated from its first position toward its second position while still engaging said first pin means to hold said hinge arms in their upright position, said latch member when moved to its third position allowing said first pin means and said hinge arms along with the rotated back rest unit to be moved together from said upright position toward said generally horizontal position whereby said backside of said back rest will be located rearwardly of the seat cushion to provide a flat cargo platform, and
a second latch mechanism having a pivotal latch member which is movable between a first position in which it engages a stationary catch member to prevent said hinge arms from being moved rearwardly past their upright position and a second position in which it clears said catch member to allow said hinge arms to be moved rearwardly from their upright position toward their generally horizontal position, spring means for biasing said latch member towards its first position, said latch member of said second latch mechanism being engaged by said second pin means on said back rest unit to move the same toward its second position when the back rest unit is moved toward its second position.

5. In combination with a vehicle having body support structure, a rear door movable between open and closed positions and a seat assembly supported by said body support structure and including a generally horizontal seat cushion unit and a back rest unit which is adapted to be moved from a generally upright position to a generally horizontal position located rearwardly of the seat cushion to provide a cargo platform, said back rest unit comprising a pair of laterally spaced hinge arms pivotally supported for movement about a generally horizontal axis between an upright position and a generally horizontal position located rearwardly of the seat cushion, a back rest rotatably supported intermediate its ends by said hinge arms for movement about a generally horizontal axis between a first position in which its cushion side is adjacent the seat cushion unit and a second position in which its backside is adjacent the seat cushion unit, and means for holding said seat back unit in its upright position, allowing said back rest to be rotated from its first position toward its second position and allowing said back rest and hinge arms to be pivoted from an upright position toward said generally horizontal position, the improvement being that said last mentioned means comprises a latch mechanism having a three position lever means which is operable when in its first position to hold the hinge arms in their upright position and the rest back in its first position, which is operable when moved to its second position to release the back rest for manual movement from its first position to its second position while retaining said hinge arms in their upright position and which is operable when in its third position to allow the hinge arms and seat back rest to be moved in unison from an upright position to said generally horizontal position rearwardly of the seat cushion, and wherein said back rest includes first and second generally planar members pivotally supported on the backside thereof at its upper and lower ends, respectively, when said seat back unit is in its upright position, said first and second members being pivotally movable between a folded position in which they lie against the backside of the seat back rest and an unfolded position when the seat back rest is in its horizontal position in which said first member overlies said seat cushion unit and said second member extends between said back side of said back rest and the rear door whereby said first and second members and said backside of said seat back rest provide a flat cargo carrying platform.

* * * * *

UNITED STATES PATENT AND TRADEMARK OFFICE
CERTIFICATE OF CORRECTION

PATENT NO. : 4,428,611
DATED : January 31, 1984
INVENTOR(S) : Paul Widmer

It is certified that error appears in the above-identified patent and that said Letters Patent are hereby corrected as shown below:

Column 10, line 42, after "back" insert -- rest --.

Signed and Sealed this

Tenth Day of July 1984

[SEAL]

*Attest:*

GERALD J. MOSSINGHOFF

*Attesting Officer*     *Commissioner of Patents and Trademarks*